United States Patent
Richter et al.

[15] 3,693,331
[45] Sept. 26, 1972

[54] WINDROW LEAF SCAVENGER

[72] Inventors: John Edward Richter; George Olavi Tiura, both of Modesto, Calif.

[73] Assignee: Agmac, Inc., Ripon, Calif.

[22] Filed: Aug. 9, 1971

[21] Appl. No.: 169,902

[52] U.S. Cl.................56/13.2, 56/13.3, 56/328 R, 56/DIG. 8, 209/139 R
[51] Int. Cl. .............................................A01g 19/00
[58] Field of Search................56/12.8–13.4, DIG. 8; 15/383; 209/133, 138, 139 R, 146, 147, 153

[56] References Cited

UNITED STATES PATENTS

| | | | |
|---|---|---|---|
| 2,657,798 | 11/1953 | Young | 209/138 |
| 2,717,077 | 9/1955 | Leighton et al. | 209/139 R |
| 2,807,128 | 9/1957 | Helfrich | 56/328 R |
| 2,854,808 | 10/1958 | Ramacher et al. | 56/328 R |
| 2,916,868 | 12/1959 | Ramacher et al. | 56/328 R |
| 2,978,858 | 4/1961 | Tubbs | 56/328 R |
| 3,520,123 | 7/1970 | Patterson | 56/328 R |

*Primary Examiner*—Antonio F. Guida

[57] ABSTRACT

This invention pertains to machines for handling nuts and other ground-harvested crops and particularly relates to a windrow leaf scavenger machine which affords airborne separation of leaves from nut-like fruit on the ground.

Certain ground-harvested crops including nuts such as pecans and late walnuts are harvested after a hard frost or rain which removes most of the leaves from the trees in the orchard. The harvest then must deal with the desired nuts intermixed with a large quantity of unwanted leaves, twigs and the like. The harvesting procedure entails operation of a windrowing machine in the orchard to arrange all of the nuts and leaves, twigs, etc. into windrows. It has been found that the quantity of leaves and other unwanted materials present in the windrow under such harvest conditions impede the efficient operation of the picker machines commonly employed in sifting the nuts from the large quantity of leaves. It is highly desirable to have available a machine to remove the unwanted leaves etc. from the windrow while leaving the nuts or other ground-harvested crops on the ground arranged in a desirable pattern for harvesting.

13 Claims, 6 Drawing Figures

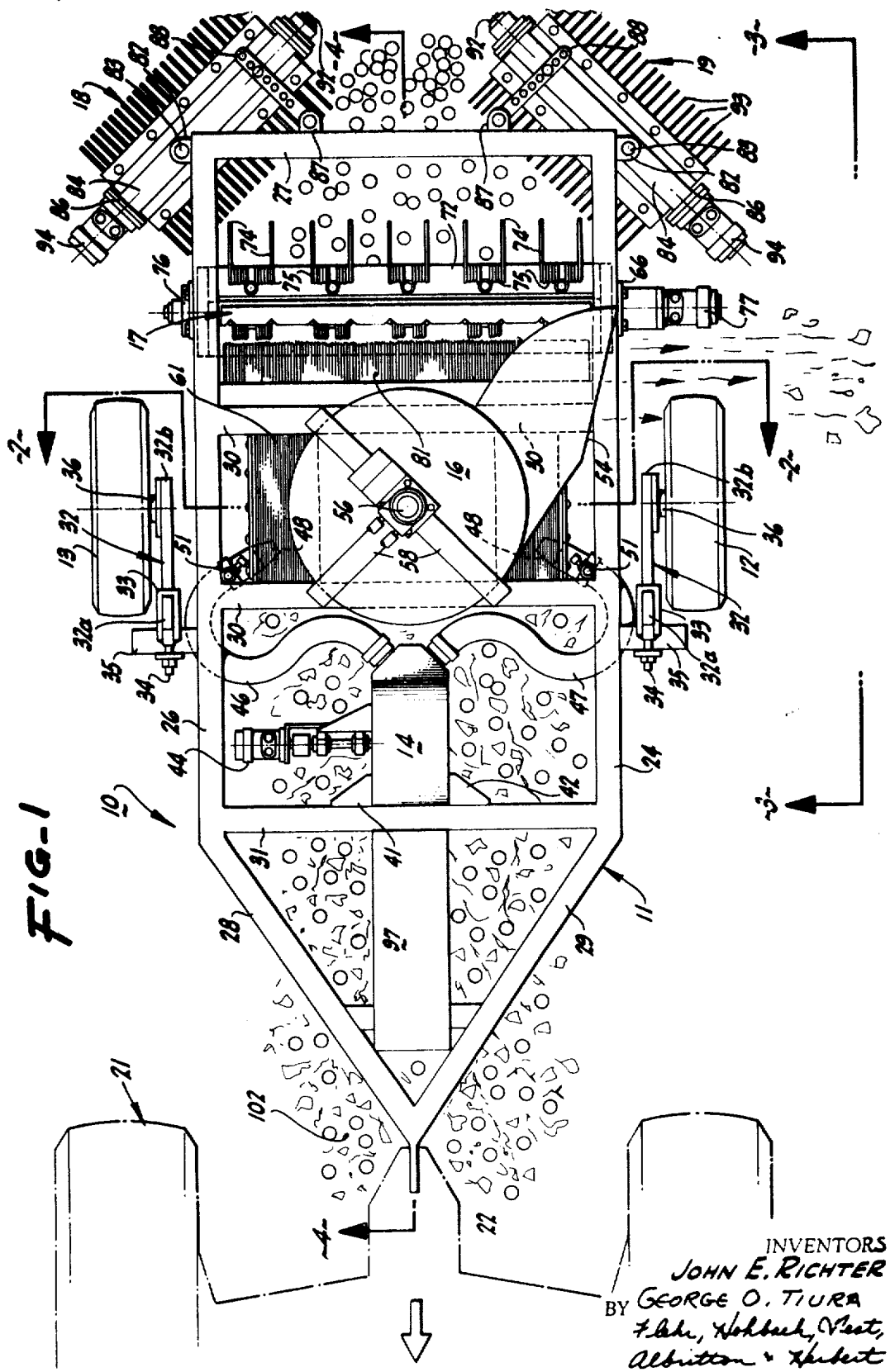

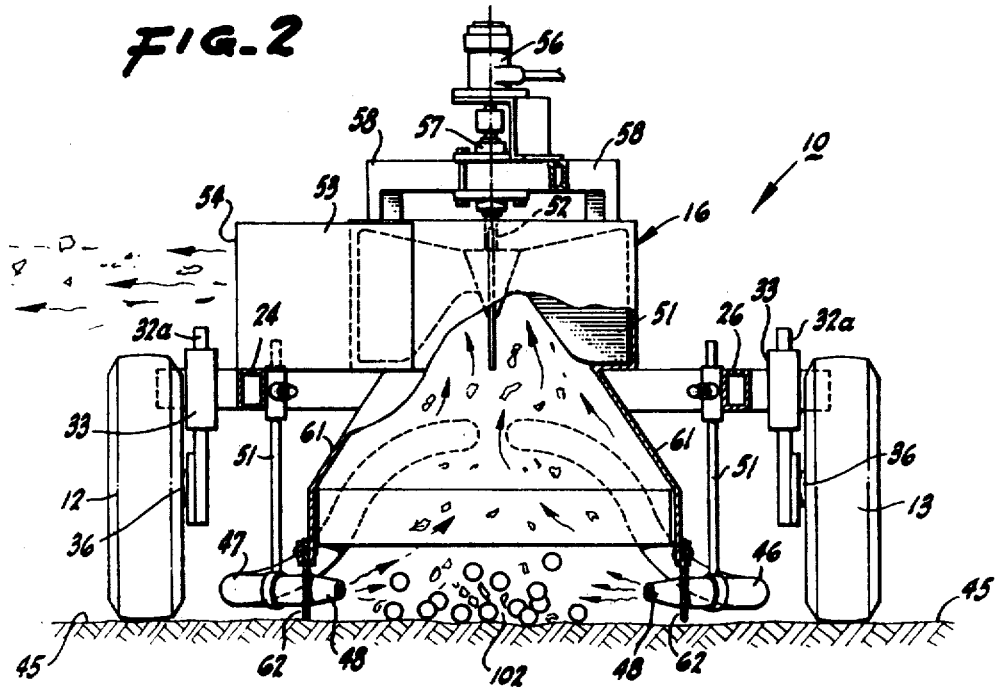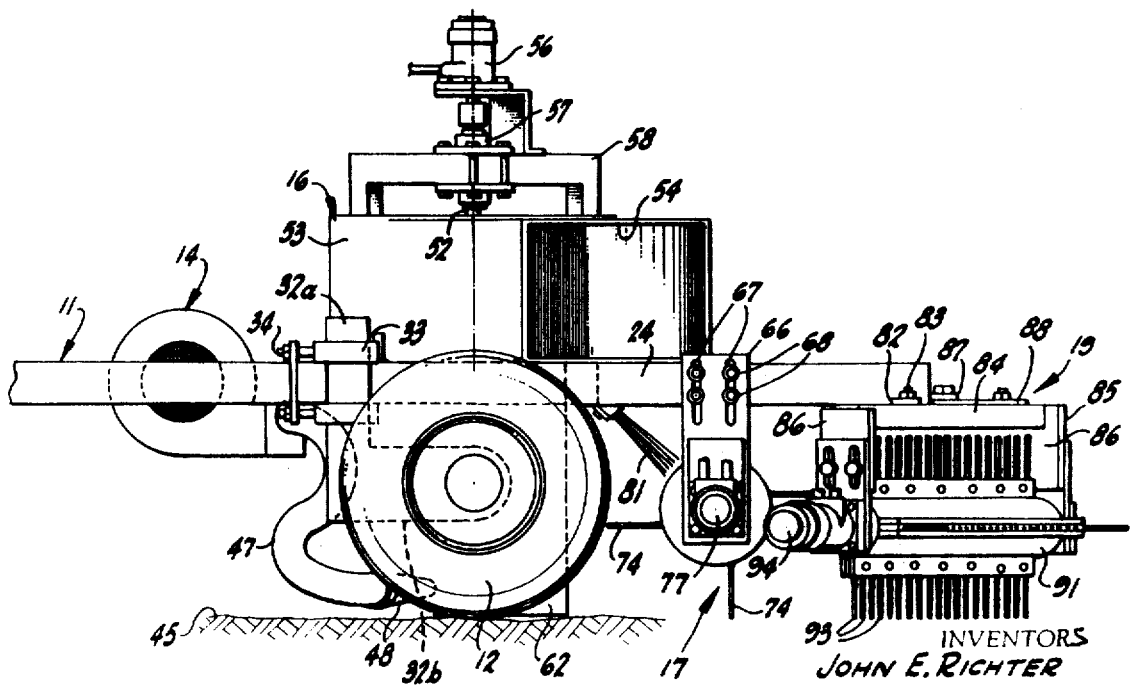

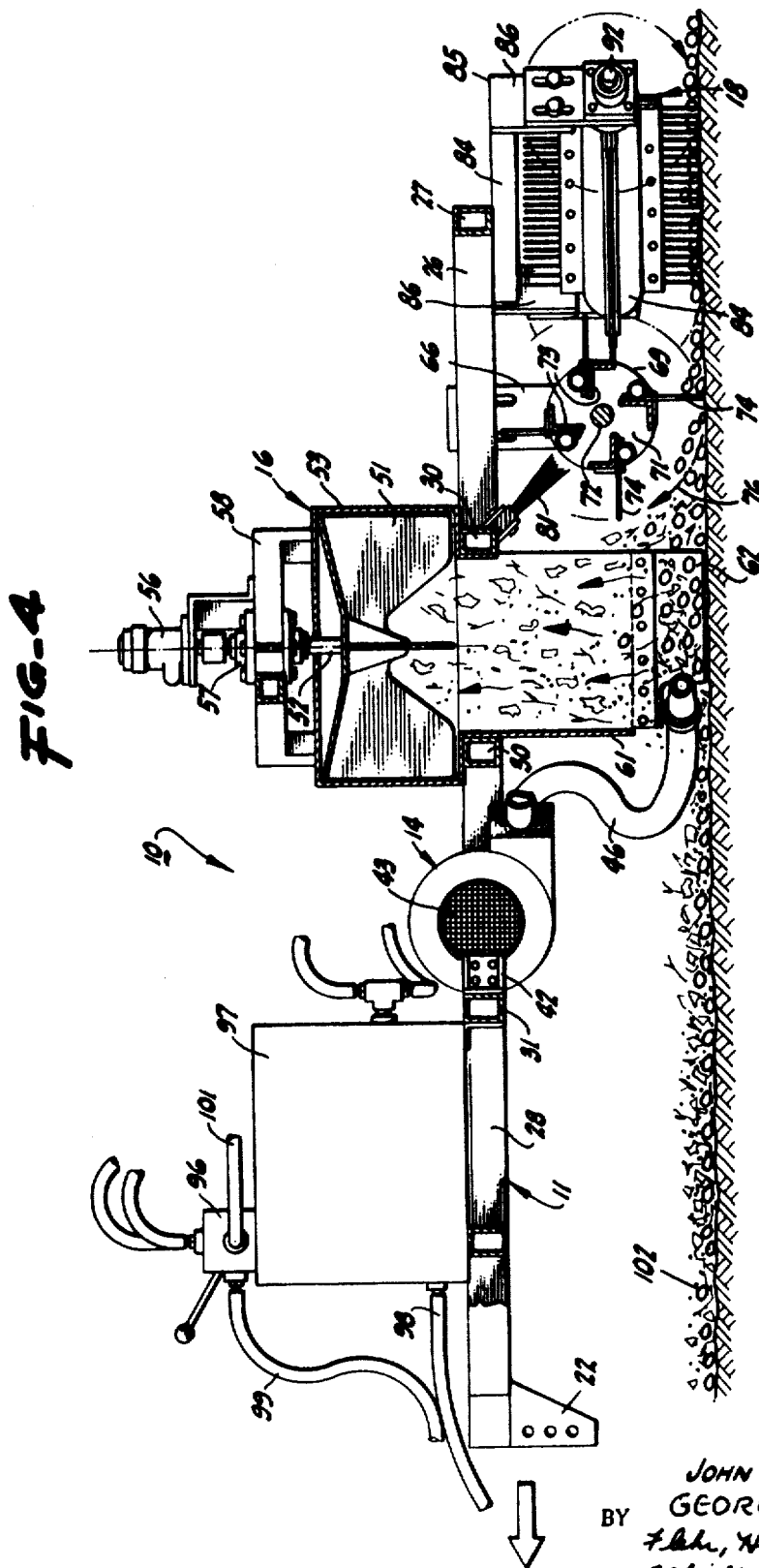

WINDROW LEAF SCAVENGER

OBJECTS AND SUMMARY OF THE INVENTION

In summary the invention is directed to a leaf scavenger having a mobile wheel supported frame for movement along a windrow, the frame being provided with blower means discharging streams of air generally along the ground serving to raise leaf-like material. Suction producing means are carried on the frame and has a suction inlet disposed proximate the ground and proximate the discharge of the blower means. An outlet of the suction means is directed laterally of the windrow. Mechanical agitating means serve to urge materials from the ground towards the inlet of the suction means and power means drive the blower, suction and agitating means.

An object of the invention is to provide a machine for airborne separation of leaves, twigs and the like from a windrow prepared in the harvest of nuts or similar ground-harvested crops.

Another object of the invention is to provide an improved machine useful in the harvesting of nuts which employs both pneumatic and mechanical agitation to create a fluffing action for removal of leaf-like materials from a windrow and for discharging the same laterally of a windrow.

Another object of the invention is to provide a machine of the type described which includes sweepers for windrowing nuts and similar ground-harvested crops.

Another object of the invention is to provide a machine of the type described for removing leaves, twigs and the like from a windrow so that a following nut harvester machine may operate with greater efficiency.

Further objects of the invention will appear from the following detailed description taken in connection with the drawings.

BRIEF DESCRIPTION OF THE DRAWINGS

FIG. 1 is a plan view of the leaf scavenging machine of the present invention;

FIG. 2 is a vertical sectional view in the direction of the arrows 2—2 of FIG. 1;

FIG. 3 is a vertical side view in the direction of the arrows 3—3 of FIG. 1;

FIG. 4 is a vertical section view in the direction of the arrows 4—4 of FIG. 1;

DESCRIPTION OF THE PREFERRED EMBODIMENT

Figure 5:
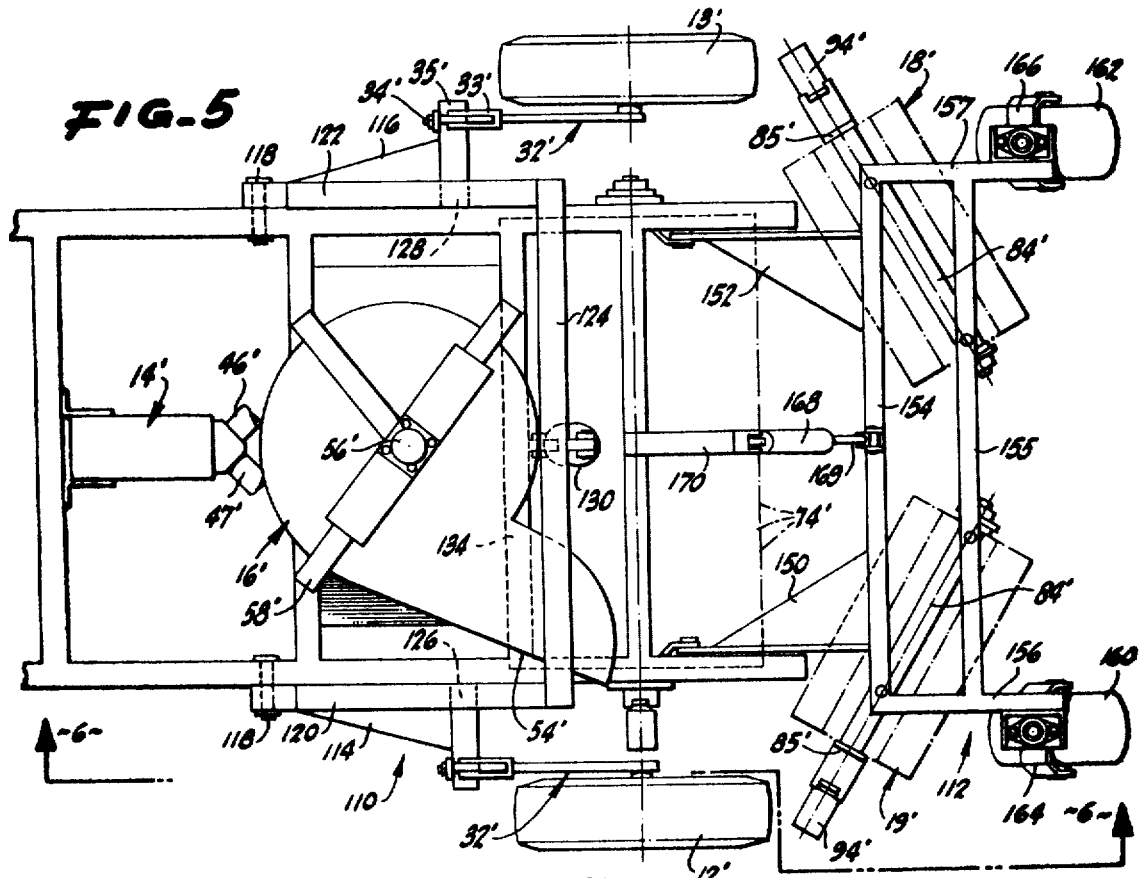
FIG. 5 is a top plan view of another embodiment of the leaf scavenger machine of the present invention as equipped with hydraulically elevatable wheel structures.

A windrow leaf scavenger 10 is show in the drawings and comprises a generally rectangular, perimeter frame 11 having mounted adjacent the rear end thereof a pair of wheels 12 and 13, as shown in FIGS. 1 and 2. Operatively arranged on the frame 11 are a blower unit 14, an air suction producing unit 16, a mechanical rake or picker roller 17 and sweepers 18 and 19, as shown clearly in FIGS. 1 and 4.

The mobile windrow leaf scavenger 10 as shown in the drawings is adapted to be towed by a tractor 21 (indicated by broken lines in FIG. 1) and the frame 11 is equipped at the forward end with a hitch 22 for attachment to the tractor 21 by means of a bolt (not shown).

On the other hand, this invention also contemplates that the windrow leaf scavenger may be a self-powered vehicle equipped with steerable forward wheels, brakes, motor and power transmission as is desirable for certain applications.

The frame 11 is elongate in overall outline and may be constructed from commercially available structural shapes welded together into a perimeter frame. The frame, as shown in FIG. 1, may comprise side rail members 24 and 26, an end member 27 and the triangularly arranged forward members 28, 29 and 31. Two intermediate cross members 30 are disposed between members 27 and 31.

The ground engaging wheels 12 and 13 are mounted with respect to the frame to place the rotational axis of the wheels in substantial alignment with the rotational axis of the mechanical rake or picker roller 17. This arrangement permits the roller 17 to maintain in the selected height above the ground regardless of terrain irregularities. As shown in FIGS. 2 and 3, the wheels 12 and 13 are arranged for vertical adjustment, and to this end each wheel assembly includes an L-shaped carrier arm 32. The upstanding leg 32a of the carrier arm (FIG. 3) is received within a mounting bracket 33 rigidly secured to a horn-like lateral frame member 35 welded to the frame side rail. Each mounting bracket 33 is provided with a pair of adjustment bolts 34 which may be loosened and retightened to afford vertical adjustability of the carrier arm 32 with respect to the mounting bracket 33. The horizontal leg 32b of the carrier arm 32 is equipped with an axle 36 for rotatably mounting the wheel in a conventional manner.

Referring to FIGS. 1, 3 and 4, the blower unit 14 arranged on the frame 11 is fixedly secured to the forward transverse member 31 by means of the mounting brackets 41 and 42 with the air intake 43 of the blower (FIG. 4) disposed to the left of the frame center and with the blower drive unit 44 (FIG. 1) projecting to the right of the frame center. The blower unit may be of a conventional centrifugal or fan-type design but is arranged to discharge air into two or more separate streams at substantially ground level. More particularly, air discharge ducts or hoses 46 and 47 are each equipped with nozzles 48 at their free ends and are connected at their opposite ends to the blower 14, shown best in FIG. 1. Each hose-nozzle unit is supported on the frame by an adjustable strut and fixture 51 (FIG. 2) so that the disposition of the nozzles 48 with respect to the ground 45 may be varied to accommodate height adjustments of the frame as when the wheels are raised or lowered. It will be observed that the discharge nozzles are oriented to project streams of air in a converging pattern extending opposite to the direction or path of travel of the machine which is indicated by the arrow 50 in FIG. 1. The blower unit 14 supplies air at a sufficient volume and velocity for ejection by the nozzles 48 so as to raise from a windrow the leaf-like materials and twigs disposed therein in a "fluffing" action. The velocity and volume of air may be varied by suitable control of the motor 44. The air hoses 46 and 47 may be formed of three-inch diameter flexible conduit and the nozzle 48 may have a discharge orifice on the order of 1 ¼ to 3 inches diameter.

The air suction unit 16 is arranged on the frame rearwardly of the blower 14 (FIGS. 1, 4) and comprises a multiblade impeller mounted on a vertically extending shaft 52 to rotate within a housing 53. The housing 53 is provided with a discharge opening 54 (FIGS. 1 and 3) disposed on the left side of the machine which affords discharge of the leaf-like materials laterally of the windrow and the path of travel. The impeller shaft 52 extends upwardly and is coupled to a motor 56 through suitable coupling gear and bearings 57 mounted on a motor support frame 58 which is rigidly secured, as by welding, to the frame cross members 30, FIG. 1.

A vertically arranged suction duct 61 (FIGS. 2 and 4) is disposed centrally of the impeller 51 and extends below the general plane of the frame 11 terminating in a flexible skirt 62 along the sides of the duct, as shown in FIG. 2. Desirably, the duct 61 should have a width complimentary to that of a mechanical rake or agitator 17 so as to receive the materials propelled forwardly by the rake. The motor 56 drives the impeller 53 in a direction to draw air upwardly through the duct 61 producing a substantial suction effect and lifting leaf-like materials through the duct to discharge them through the discharge opening 54 laterally of the windrow. It will be observed that the air blower nozzles 48 eject air in converging streams into the suction zone of the duct 61. This arrangement greatly assists in raising leaf-like materials in a "fluffing" action from the windrow and encourages leaf movement upwardly into the air suction unit 16.

The mechanical rake or picker roller 17 is mounted transversely of the frame between the side rails 24, 26 and intermediate the wheels 12, 13. The rake unit is mounted for vertical adjustment and to this end is provided with side plates 66 (FIGS. 3 and 4), each of which is equipped with a pair of vertically elongated slots 67 which receive two bolts 68 each for attachment to a frame side rail. The mechanical rake or agitator 17 includes a reel 69 arranged laterally of the frame 11 and having circular end plates 71 (FIG. 4) mounted on an axle shaft 72 and interconnected by the four laterally extending angle irons 73. Upon each angle iron there is mounted a plurality of tines 74 projecting generally radially outwardly of the reel. The mounting base of each set of tines comprises a coil spring 75 (FIG. 1) affording a resilient mounting of the tines 74 with respect to the supporting angle irons 73.

Referring to FIG. 1, a bearing support 76 is fixedly secured to the side plate 66 which is mounted on the right frame side rail 26. The shaft for the reel 72 is supported at one end by the bearing support 76 and at the opposite end is driven by a motor 77 so as to rotate the reel in the direction indicated by the arrow 78 (FIG. 4) so as to sweep leaf-like materials towards the suction duct 61 of the air suction unit 16.

An elongated array of cleaner brushes 81 (FIGS. 1, 3 and 4) extends laterally of the frame and projects downwardly from the rearward cross member 30 into the path of the tines 74 for removing any materials caught on the tines so that such materials may also fall into a suction zone of the duct 61. The brush member 81 may be constructed of conventional brush-like fiber materials, as is well known in the art.

At the rear end of the frame 11 there are provided two sweeper rollers 18 and 19, each arranged at an adjustable oblique angle with respect to the path of travel on the leaf scavenger 10 (FIGS. 1, 3 and 4) and driven so as to sweep nuts and the like into a windrow disposed centrally of the machine 10 for subsequent picking-up by other harvesting equipment. Each sweeper 18 and 19 is adjustable in a horizontal plane to change its sweeping angle, and to this end the frame 11 at the rear corner is equipped with an earlike bracket 82 for receiving a vertical shaft or bolt 83 which is attached to a horizontal member 84 of the inverted, generally U-shaped sweeper frame 85 which includes the downwardly extending sweeper side members 86 (FIG. 3). The end rail member 27 of the machine frame 11 is provided for each rotatable brush unit with a rigidly secured bracket 87 connected to a multi-holed spacer arm 88 which in turn is secured to the horizontal frame member 84 of the sweeper. This arrangement affords adjustment of the angular disposition of the sweeper with respect to the path of travel of the scavenging machine.

Each sweeper 18 and 19 includes a rotatable drum 91 mounted upon a horizontal shaft 92 (FIG. 1). A plurality of radially extending sweeper elements 93 are mounted on the drum 91 and preferably the sweeping elements are formed of wire-like material well known in the art. A motor 94 is arranged on the outside sweeper side plate 86 for driving the shaft 92 for rotating the sweeping elements forwardly and towards the center line of the machine.

The five motors on the windrow leaf scavenging machine (Motor 44 of the blower unit 14, motor 56 of the air suction unit 16, motor 77 of the mechanical rake or agitator 17, and the two motors 94 of the sweepers 18 and 19) are preferably all hydraulic motors. These may be either of gear motor design, vane or axial piston motor or other design and all are well known in the hydraulic power art. Being that the motors are preferably hydraulic motors, each of the motors is provided with two lines, one communicating with a source of hydraulic power such as a hydraulic pump (not shown) mounted upon the scavenging machine 10 or located on the tractor 21. A motor control unit 96 (FIG. 4) is mounted upon a hydraulic oil reservoir 97 located at the forward part of the frame and the control unit valve assembly 96 is constructed to provide selective varying of the speeds of the motors, all as known and understood in the art. Suitable hydraulic lines 98, 99 and 101 are provided for connecting the motor control unit 96 and reservoir 97 to the hydraulic pump.

OPERATION

In the operation of the windrow leaf scavenger of the present invention, it should first be assumed that a windrow has been formed in the orchard by conventional windrow-forming machines so as to place in a desired harvesting pattern nuts or other nut-like ground-harvested crops. The windrow may also include a substantial volume of unwanted leaves, twigs and the like. The machine 10 is hitched to a tractor 21 and the hydraulic lines 98 from the scavenger machine 10 to the tractor are interconnected so as to provide hydraulic power to the motors 44, 56, 77 and 94 to place in operation the air blower, the air suction unit, the mechanical rake or agitator and the two sweepers. As the scavenging machine 10 is moved down a windrow, as exemplified by the numeral 102 in FIG. 1, air is discharged rearwardly of the machine's direction of travel to raise leaf-like materials from the ground in a "fluffing" action and propel them into the suction duct 61. The leaves etc. are sucked upwardly through the duct and are discharged through the discharge outlet 54, after passing through the impeller 51. The discharge of leaves etc. is in a direction lateral to the path of travel of the machine moving this material away from the path of the nut pick-up equipment which follows the machine 10. This permits the nut-harvesting machinery to operate at significantly greater efficiency than if the windrow were untreated by the leaf scavenger 10.

The mechanical agitator or rake 17 sweeps twigs and leaf-like material, which may have been compacted due to moisture and rain, forwardly into the suction duct so that these materials may also be raised upwardly in a fluffing fashion through the machine. The windrow, now substantially devoid of leaves, is reshaped by the two brush-like sweeper units 18 and 19 to place the nuts in a narrow row for subsequent picking-up by other harvesting equipment.

Figure 6:
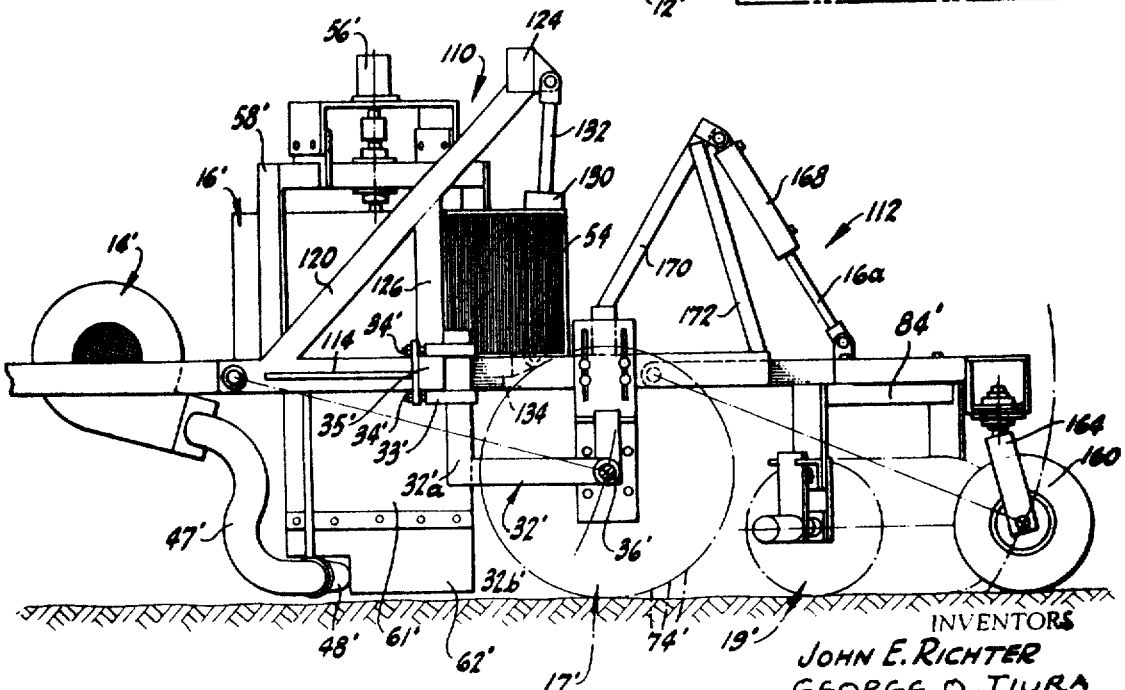
FIG. 6 is a side view partially broken away taken along the lines 6—6 of FIG. 5.

Referring now to FIGS. 5 and 6 there is shown an alternative embodiment of the leaf scavenger machine of the present invention which utilizes subframes 110, 112 of adjustable elevation for controlling the height above ground of the machine and for facilitating movement of the machine from place to place. As most of the other parts of this embodiment are identical to those of FIGS. 1–4, such like parts will be given like numbers with the addition of the prime (').

Thus, there is provided a main wheel subframe 110 consisting of a rigid assembly mounted for pivotal movement at its forward ends. Subframe 110 includes trailing arms 114, 116 secured at their forward ends on pivot bolts 118 carried in the side members of the frame. The trailing arms are rigidly interconnected into a unitary structure by upwardly and rearwardly extending brace members 120, 122 and a cross-brace 124 running over the top of the machine. Additional support is provided by trusses 126, 128 connected as by welding between the upper ends of respective members 120, 122 and the trailing arms 114, 116. Wheels 12' are arranged for vertical adjustment together with the subframe, each wheel assembly including an L-shaped carrier arm 32' having an upstanding leg 32a' which is received within a mounting bracket 33' rigidly secured to the end of the horn-like lateral member 35' welded at the end of each trailing arm. Each member bracket 33' is provided with a pair of adjustable bolts 34' which may be loosened and retightened to afford a vertical registry of the respective trailing arm with respect to the subframe as a whole and to ground level. Horizontal leg 32b' of the carrier arm carries an axle 36' for rotatably mounting the wheel 12' in a conventional manner.

Means are provided for hydraulically elevating the main wheel subframe assembly 110 and includes a hydraulic cylinder 130 and piston rod 132 pivotally connected between the cross-brace and a fixture 134 carried by the main frame. In operation for movement from place to place the hydraulic cylinder is actuated into contraction to cause the rear of subframe 110 to be carried downwardly and thereby elevate the framework and associated parts, brushes and the like. When ready to use the machine the hydraulic cylinder is actuated to extend until the picker roll tines 74' are in near contact with the ground.

To adequately accommodate elevational movement of the frame as first described, it is also desirable to provide a separate subframe 112 for mounting the sweeper rollers 18' and 19'. Thus, the main frame in the embodiment of FIGS. 5 and 6 is truncated and supports rearwardly extending trailing arms 150, 152 set on pivot bolts secured through side members of the main frame. The trailing arms are interconnected by cross-braces 154, 155, 156, 157 and are provided at their ends with means for carrying wheels 160, 162 mounted in offset caster assemblies 164, 166 for providing motion in any direction while supporting the subframe.

Means are provided for elevating the subframe 112 and consists of hydraulic cylinder 168 and piston rod 169 connected between the subframe 112 and a boom 170 rigidly supported in a triangular configuration by strut 172. By contracting the hydraulic cylinder the position elevation of the subframe is directly controlled as shown in FIG. 6. If fully contracted the subframe is pulled up and entirely out of the way. In such position suitable for movement from non-operational movement from place to place.

Thus, there has been provided a novel nut and leaf separator and leaf scavenger particularly adapted for use on windrows. The machine is readily transported about fields, is automatic in operation and in one embodiment is completely adjustable for optimum operation. By combining mechanical lifting agitation, blowing agitation, together with suction, the leaves are effectively removed from the nuts which remain, to be reorganized by the windrow sweeper rollers for harvest.

We claim:

1. In a windrow leaf scavenger machine the combination comprising a wheel-supported, mobile frame for movement longitudinally of a windrow, blower means on said frame arranged to provide an air discharge in a stream extending generally along the ground serving to raise leaf-like materials therefrom, suction producing means on said frame having an inlet disposed proximate to the ground and to the discharge of said blower means serving to entrain the leaf-like materials therethrough, said suction means having a discharge outlet oriented to project the materials generally laterally of the frame, mechanical agitating means rotatably mounted on said frame for lifting materials from the ground into and towards the inlet of said suction means, and power means serving to drive said blower means, suction means and agitating means.

2. The machine of claim 1 wherein said blower means includes a plurality of air discharge ducts arranged to direct air streams in a converging pattern with respect to the intake of said suction means.

3. The machine of claim 1 wherein the air discharge of said blower means is directed generally rearwardly to the normal path of travel of said machine, and wherein said mechanical agitating means is rotated in a direction so as to propel materials forwardly with respect to the path of travel of said machine.

4. The machine of claim 3 and including sweeper means arranged on said frame to engage the ground rearwardly of said mechanical agitating means for sweeping materials in the path of said machine into a windrow.

5. The machine of claim 1, wherein said mechanical agitating means comprises a reel mounted generally laterally of said frame and includes a plurality of radially outwardly directed rows of resiliently mounted tines, control means cooperable with said power means permitting selective variation of rotational velocity of said reel, and tine cleaner means mounted laterally of said frame and projecting into the rotational path of said tines.

6. The machine of claim 5, wherein said tine cleaner means includes an elongate array of brushes fixedly arranged with respect to said machine frame.

7. The machine of claim 1, wherein the inlet of said suction producing means is equipped along its perimeter with a flexible, vertically disposed skirt, the air discharge of said blower means being arranged to project a plurality of air streams inwardly within the confines of said skirt.

8. In a windrow leaf scavenger machine the combination comprising an elongate frame, a pair of wheels rotatably mounted on said frame in a laterally spaced apart relationship, raking means rotatably mounted on said frame intermediate said wheels, first power means on said frame for driving said rake means to propel materials forwardly of said frame, cleaner means mounted on said frame cooperable with said rotatable rake means for maintaining the same in an unobstructed, unblocked condition, a vertically arranged duct extending downwardly of said frame and having an inlet disposed forwardly of said rake means proximate to the ground level, said duct having a discharge outlet directed generally laterally of said frame, air impeller means cooperably arranged with respect to said duct for producing an updraft through said inlet, second power means on said frame serving to drive said impeller means so as to generate an updraft through said inlet for raising leaves from the ground to expel the same through said discharged outlet of said duct, blower means on said frame and including a plurality of air discharge nozzles arranged forwardly of said duct inlet and directed to project streams of air along the ground and into said duct inlet, and third power means on said frame for operatively driving said blower means.

9. The machine of claim 8, wherein said rake means is of a width commensurate with the width of the duct inlet.

10. The machine of claim 8, wherein a plurality of sweeper means are arranged on said frame rearwardly of said rotatable rake means serving to sweep nuts and the like in the path of said machine into a windrow.

11. The machine of claim 8, wherein the inlet of said duct is equipped with flexible, vertically extending skirt means, said blower nozzles extending through the perimeter of said skirt means.

12. The machine as in claim 8, further including a subframe mounting said wheels, said subframe serving to carry said wheels in laterally spaced relationship alongside said frame, said subframe including a framework constructed for movement to change the elevation of said wheels relative to said frame, and means for changing the elevation of said subframe.

13. The machine as in claim 10, further including a subframe mounting said wheels, said subframe serving to carry said wheels in laterally spaced relationship alongside said frame, said subframe including a framework constructed for movement to change the elevation of said wheels relative to said frame, and means for changing the elevation of said subframe, together with a second subframe mounted on wheels at one end for carrying said sweeper means, and mounted for pivotal movement on said frame, means for changing the elevation of said subframe about said pivot mounting to thereby permit elevation of said sweeper means away from the ground to facilitate relative movement of said machine from place to place.

* * * * *